METHOD OF MANUFACTURING COMPOSITE METAL WIRES

Filed May 15, 1961 2 Sheets-Sheet 1

INVENTORS
Tetsuo Saito
Kenkichi Yamaji
Kimio Kakizaki
BY
Stevens, Davis, Miller & Mosher
ATTORNEYS

METHOD OF MANUFACTURING COMPOSITE METAL WIRES

Filed May 15, 1961 2 Sheets-Sheet 2

INVENTORS
Tetsuo Saito
Kenkichi Yamaji
Kimio Kakizaki

BY
Stevens, Davis, Miller & Mosher
ATTORNEYS 3,167,857
Patented Feb. 2, 1965

3,167,857

METHOD OF MANUFACTURING COMPOSITE METAL WIRES

Tetsuo Saito, Kenkichi Yamaji, and Kimio Kakizaki, Hitachi, Japan, assignors to Hitachi Wire & Cable Limited, Tokyo, Japan, a corporation of Japan Filed May 15, 1961, Ser. No. 110,028
Claims priority, application Japan, Sept. 7, 1960, 35/37,564
2 Claims. (Cl. 29—474.1)

The present invention relates to a method of manufacturing composite metal wires by pressure welding, and more particularly, to a method of manufacturing composite metal wires which is characterized by pressure welding different metal pieces, such, for instance, as pressure welding aluminum, aluminum alloys, copper, or copper alloys integrally on a tinned wire of steel, nickel, tungsten or like material.

When two metal pieces of different kinds are pressed together under extremely high pressure without any substantial application of external heat thereto, or when the two metal pieces are laminated and the laminated portion is pressed with dies of suitable shape from both sides, then the two metal pieces can be bonded or merged into an integral body by the plastic flow or atomic diffusion of the metal between the two pieces. This phenomenon has been disclosed in the specification of U.S. Patent No. 2,707,889. In so-called cold pressure welding in which metal pieces are pressed together at room temperature, different steps are taken in accordance with the material and shape of the metal pieces to be welded, but generally in case of welding metal wires use is made of butt welding and in case of welding metal plates or metal foils a lap welding is adopted. When a pipe is formed from a metal tape the edges are continuously welded by means of press rolls. The cold pressure welding and hot welding of two metal pieces can be clearly distinguished by the recrystallization temperature inherent in the metal from the metallurgical structure of metals, and if the welding is carried out at a temperature below the recrystallization temperature it is called a cold pressure welding, and in like case of different metals having different recrystallization temperatures the metal having lower recrystallization temperature is taken as a standard. But in known cold pressure welding there was no such standard or trial in the case in which the metal pieces to be welded were cold pressure welded at a state of being heated just below the recrystallization temperature. Accordingly cold pressure welding usually meant pressure welding with substantially no external heat being applied to the members to be welded. On the contrary, in hot welding it has been usual to heat the metal pieces to be welded to a temperature above the recrystallization temperature and to such a state that they begin to semi-melt before they are welded.

After various experiments and investigations in regard to the pressure welding using some heating combining the merits of both the cold pressure welding and hot welding, the inventors have found that if the metal pieces to be welded are subjected to pressure welding accompanied with heating below the recrystallization temperature by inserting an intermediate metal layer between the two metals to be welded much better characteristics can be obtained than those obtainable in the case of cold pressure welding with substantially no external heat being applied to the metal pieces to be welded. The mechanical properties here mean the elongation, torsion, or impact resistance, tensile strength and winding and unwinding strength and it is surprising that the above characteristics can be improved without sacrificing the other mechanical properties. In other words, according to the pressure welding of the invention the mechanical properties can be further improved without disturbing various characteristics obtainable by known processes.

The principal object of this invention is to provide a method of manufacturing firmly bonded and covered composite metal wires utilizing pressure welding having the above described merits and enabling mass production at a lower cost.

Another object of this invention is to provide composite metal wires of any suitable combination of metals enabling pressure welding of metals which could not easily be bonded by the former cold pressure welding.

The above mentioned various objects can be attained by the method of manufacturing composite metals according to the invention. The invention is characterized in that a metal wire which constitutes a core is previously covered with thin film of a metal which is different from each of the metals to be welded and has a larger diffusion coefficient than those of said two metals and the core wire is heated to a temperature below its recrystallization temperature and wrapped continuously with a metal strip without heating. The wire core with its metal covering is passed between sets of press rolls to effect cold pressure welding, thereby forming metal coating layer on the core wire integrally therewith. Afterwards any fins projecting from the surface and caused during the cold pressure welding are cut off, the composite wire is finished to a desired outer diameter.

According to the invention, the metallic coating located between the core wire and covering metal should be a metal having a larger diffusion coefficient than that of each of the metals to be welded in order to make diffusion of atoms easier. One of the reasons for previously heating the core wire to a temperature below its recrystallization temperature is that, as already explained, it can result in better mechanical characteristics than in the case where the metal to be welded is not heated previously. Another reason is that when the metal is heated to a temperature below the recrystallization temperature the formation of oxidized film coating which prevents the diffusion of atoms at the cold pressure welding is minimized. On the other hand, the cost of installation and maintenance is much lower than that which is necessary for ordinary hot welding and cold pressure welding, and the mechanical properties of the welded portion according to the invention are superior to those obtainable in the case of cold pressure welding.

In order that the invention may readily be carried into effect, it will now be explained in detail by way of example, with reference to the accompanying diagrammatic drawings, in which FIG. 1 is diagrammatic arrangement of the general installation;

The accompanying drawing shows an embodiment of the device for carrying out the method of the invention and also the composite metal wires obtained by the device, that is, the various mechanical properties of the aluminum coated steel wire and copper coated steel wire are shown in comparison with those of the aluminum coated steel wire and copper coated steel wire obtained by a known process.

Figure 1:
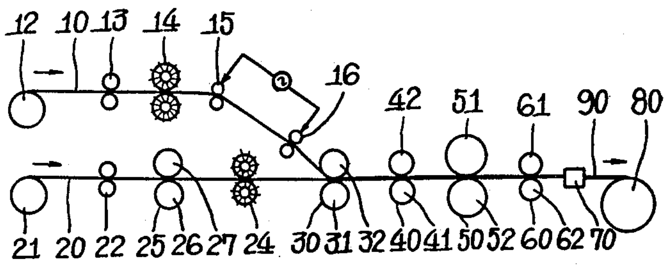
Figure 2:
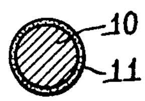
FIG. 2 is a sectional view of a steel wire with zinc plating.

FIG. 1 shows an embodiment of the device necessary for carrying out the method of the invention diagrammatically and the process for manufacturing aluminum coated steel wire will be explained in the following:

10 represents a steel wire wound on a bobbin 12 and 20 represents an aluminum tape wound on a reel 21. The steel wire 10 is coated with a zinc plating layer 11 as shown in the sectional view of FIG. 2. Zinc is a material different from the steel wire 10 and aluminum tape 20 and has a larger diffusion coefficient than that of each of the metals to be welded, i.e., the steel wire 10 and aluminum tape 20. The zinc galvanized steel wire 10 is passed through a pair of guide rolls 13, revolving wire brushes 14, a pair of first electrode rolls 15, then the second electrode rolls 16. When the steel wire 10 passes through the pairs of electrode rolls 15 and 16 which pass electric current the steel wire is heated to a temperature below about 200 to 250° C. which is lower than the recrystallization temperature of the steel wire.

Figure 3:
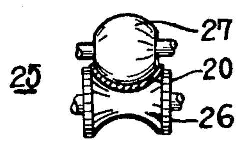
FIG. 3 is an elevation of the first forming roll.
Figure 4:
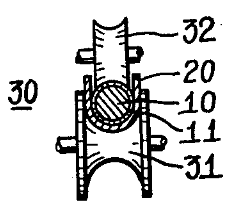
FIG. 4 is a front elevation of the second forming roll.
Figure 5:
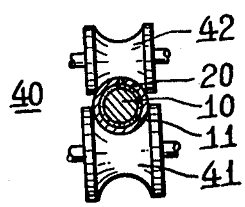
FIG. 5 is a front elevation of the third forming roll.

The aluminum tape 20 is taken through the guide rolls 22 and then passes through the first forming rolls 25 and is formed to about semi circular section for facilitating coating of the steel wire. The first forming rolls 25 consist of a concave roll 26 and a convex roll 27 as shown in FIG. 3. The aluminum tape 20 formed to about semi circular shape by the first forming roll, is then passed through a pair of revolving wire brushes 24 by which the surfaces of the tape are cleaned and scratched and then the tape is guided together with the steel wire 10 which it embraces into a pair of the second forming rolls 30 as shown in FIG. 4, where the aluminum tape 20 is deformed into U-shape to embrace the steel wire 10 by being pressed by the roll 32. Then the wire and tape pass through a third pair of forming rolls 40 as shown in FIG. 5 to completely wrap the steel wire 10 by the cooperation of a pair of concave rolls 41 and 42. The aluminum tape 20 is in contact with the zinc galvanized steel wire and its temperature is raised to 150 to 180° C. which is lower than the recrystallization temperature of aluminum tape and the oxide film formed on the aluminum tape 20 is very thin so that it does not form a barrier to the atomic diffusion of zinc and aluminum in the pressure welding to be executed thereafter.

Figure 6:
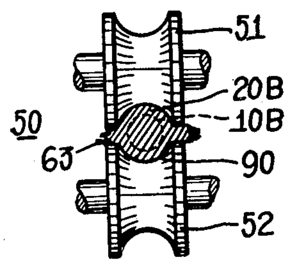
FIG. 6 is an elevation of the press roll.
Figure 7:
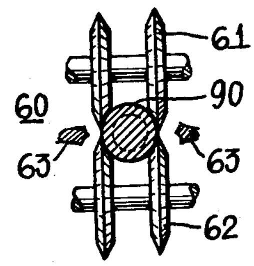
FIG. 7 is an elevation of the fins cutting rolls.
Figure 8:
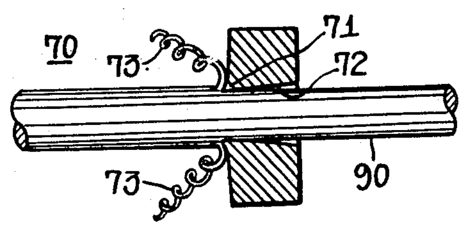
FIG. 8 is a sectional side elevation of a finishing and stripping die.
Figure 9:
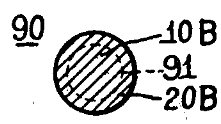
FIG. 9 is a cross sectional view of the aluminum coated steel wire (copper coated steel wire) obtained by the device embodying the invention.

This is based on the fact that a thick coating can not be formed unless there has elapsed a sufficient time and at an operation speed such as 40 m./min. in this example the time necessary for arriving at the press roll 5 from the beginning of the transmission of the temperature is less than 1 second and though the oxide film is formed in such a short heating time it is very thin so that it can easily be crushed by the force of the press roll 50 immediately thereafter so that it does not interfere with the atomic diffusion in the press welding. The press rolls 50 consist of a pair of grooved rolls 51 and 52 as shown in FIG. 6 and the aluminum tape 20 is pressure welded on the steel wire 10 at a pressure of about 150 kg./mm.$^2$ so that the aluminum tape 20 can be firmly cold welded onto the steel wire 10. Then the steel wire thus covered with aluminum is passed through the cutting rolls 60, as shown in FIG. 7, which have a pair of revolving cutters 61, 62 arranged oppositely to cooperate, thereby cutting off the fins 63 formed by roll 50. Then the wire is passed through a finishing and stripping die 70, as shown in FIG. 8, having a hole 72 and a cutting edge 71 for cutting off a part of the coated layer of aluminum 20B continuously. The aluminum covered steel wire 90 thus obtained consists of perfectly bonded three layers, steel wire 10, zinc galvanized layer 11 and aluminum tape 20, that is, zinc galvanized layer on the surface of the steel wire is usually formed by the melt dipping process and there exists an intermetallic compound and solid solution of the two metals between the steel wire and zinc galvanized layer so that these layers are in effect an integral body. Moreover, between the zinc galvanized layer and aluminum layer there is mutual diffusion of atoms and a part of the zinc atoms are shifted into the aluminum layer and also a part of the aluminum atoms are transferred to the zinc layer so that the solid solution of aluminum and zinc is formed by diffusion in the intersurface between them and adjacent thereto and thus, aluminum and zinc layers are united integrally so that the zinc galvanized steel wire and the aluminum layer become an integral body and if in this case there is no zinc layer much higher pressure or temperature should be applied in order to unite steel and aluminum as a unit and accordingly, the presence of the zinc layer is very effective in facilitating the pressure welding. The aluminum covered steel wire 90 thus finished is wound upon the winding drum 80 to complete the operation. The steel wire 10 and aluminum tape 20 are moved in the direction of the arrow by the pull of the winding drum 80 and the torque given to them by forming rolls 25, 30 and 40, press rolls 50 and cutting rolls 60, thereby maintaining the linear speed of 40 m./min.

The steel wire 10 used in this example contained about 0.8% carbon, having an outer diameter of 2.470 mm., and the aluminum tape 20 had a thickness of 0.6 mm. x breadth of 8.0 mm. The thickness of the zinc plating was 0.005 mm.

The external diameter of the finished aluminum coated steel wire 90 was 3.18 mm. (the thickness of the aluminum coating 20B was 0.355 mm.). The final finished diameter can be changed as desired by adjusting the inner diameter of the finishing and stripping die 70. The results of tests of various mechanical properties of the aluminum coated steel wire obtained by the above described method of the invention are shown in the following table. The aluminum coated sample steel wire was made for the sake of comparison by the same manner of cold welding without previously heating the steel wire from the outside.

*Tests results of mechanical properties of the aluminum coated steel wires*

| Items | Kinds | |
|---|---|---|
| | Aluminum coated steel wire made by the above example of invention | Aluminum coated steel wire made by a conventional cold welding |
| | (The following are average values taken from 10 samples) | |
| Finished outer dia. (mm.) | 3.18 | 3.18. |
| Outer dia. of steel wire (mm.) | 2.47 | 2.47. |
| Thickness of aluminum coating (mm.) | 0.355 | 0.355. |
| Tension load (kg.) | 1,052 | 1,085. |
| Elongation (percent) | 4.0 | 1.0. |
| Electric conductivity (percent) | 29.7 | 29.7. |
| Torsion test (repetitions) | 32 (non-stripping). | 20 (local stripping). |
| Hardness of A1 surface (Vickers) | 43.0 | 45.0. |
| Winding and unwinding test (its own dia.). | No change | Local stripping. |
| Impact test (16.6 kgs.–m./cm.$^2$) | Bent but no change. | Do. |
| Collapsing and stripping test | No change | Do. |

Remarks:

(1) The torsion test is expressed by the number of turns when the sample is broken by twisting it in the same direction by supporting it at both ends of a length of hundred times its own diameter (3.18 mm.).

(2) The electric conductivity is the result of measurement of samples of one meter in length and the elongation measured between marks a distance apart of 250 mm.

(3) The winding and unwinding tests show the result of checking the abnormal change after the sample has been wound and unwound on a reel ten times its own diameter (3.18 mm.).

(4) The collapsing and stripping tests show whether abnormal change occurred or not when the sample is collapsed to the external diameter (2.47 mm.) of steel wire.

As evident from the above test results, the mechanical properties of the aluminum covered steel wire obtained by the method of the invention shows remarkable improvements in the elongation, torsion and winding and unwinding test characteristics compared with those of the aluminum covered steel wire obtained by the conventional process and it is more particularly remarkable in that such improvements do not affect the other properties except the tension load is reduced a little. The reason for the improved properties of the aluminum coated steel wire manufactured by the method of the invention is considered to be based on the following points:

The improvement in the elongation characteristics is due to the fact that the steel wire is heated to a temperature lower than its recrystallization temperature, i.e., about 200 to 250° C. before pressure welding and the aluminum tape itself is also welded under a heated condition below the recrystallization temperature, i.e., 150 to 180° C. so that the hardening of the material due to the pressure welding is less than that when the material is not heated and the elongation characteristics are improved. The remarkable improvement in the twisting resistance and winding and unwinding test characteristics is due to the preliminary heating of the steel wire to a temperature below its recrystallization temperature, the zinc layer galvanized on the surface of the steel wire, cooperating to make the bonding between each metal layer very strong. More particularly, the zinc layer galvanized on the steel wire causes a further increase in the diffusion of atoms between the steel wire and the aluminum tape owing to the diffusion coefficient between the zinc layer and aluminum tape being larger than that between the steel and zinc layer. Consequently the local stripping phenomena does not occur as in the aluminum coated steel wire obtained by conventional cold pressure welding.

In case of copper coated steel wire, the process explained above with reference to the device as shown in FIG. 1 can be carried out in the same manner by using a copper tape instead of aluminum tape, except for some change in the temperature of the steel wire 10 heated to a temperature of 250 to 300° C., which is lower than the recrystallization temperature, and in the pressure of press rolls of 300 kg./cm.$^2$.

The carbon content of the steel wire is 0.8%, the external diameter of the wire 2.6 mm., the thickness of copper tape 20 being 0.6 mm. and breadth 8.0 mm. and

| Items | Kinds | | |
|---|---|---|---|
| | Copper coated steel wire made by the method of the invention | Copper coated steel wire made by a conventional method | |
| | | Ingot wire drawing | Planting method |
| Finished outer dia. (mm). | 3.2 | 3.2 | 3.2. |
| Outer dia. of steel wire (mm). | 2.6 | | 2.6. |
| Thickness of copper coating (mm). | 0.3 | 0.35 | 0.3. |
| Elongation (percent) | 3.0 | 1.5 | 3.0. |
| Tensile strength (kg./mm$^2$). | 140 | 91 | 131. |
| Electric conductivity (percent). | 40.1 | 40.1 | 40.0. |
| Torsion test (repetitions). | 18 | 18 | 18. |
| Impact test (kg.-m./cm.$^2$). | 30 (non-stripping) | 22 (non-stripping) | 26 (local cracking). |
| Winding and unwinding test (its own dia.). | (3) No change. | No change | Many cracking. |
| Collapsing strength (kg.). | 4,000 | 5,000 | 2,000. |

Remarks:
(1) The measurements of tensile strength and elongation were taken for a length of 250 mm. on the sample, and the electric conductivity was taken on a 1 m. length.
(2) Torsional strength is expressed by the number of twists until the sample is broken by twisting in one direction by holding two ends of a length of 100 times its own diameter (3.2 mm.).
(3) The winding and unwinding test was done to examine the change after the repetitions of the winding and unwinding to 10 times its own diameter (3.2 mm.).
(4) The collapsing and stripping tests were made to check the abnormal state when the steel wire was collapsed to its outer diameter (2.6 mm.).

the thickness of zinc layer 0.005 mm. Thus copper covered steel wire 90 has an outer diameter of 3.2 mm. after being finished (thickness of the copper layer is 0.3 mm.).

Mechanical properties of the copper covered steel wire made by the method of the invention and those made by an ingot drawing process wherein the steel is cast in copper and the cast block is wire drawn, and the copper plating process wherein the copper is directly plated on a steel wire are shown for the sake of comparison. The results in the table show an average value of 10 samples.

As evident from the test results of mechanical properties as above explained the copper coated steel wire manufactured by the method of this invention shows remarkable improvements in tensile strength, elongation, impact resistance, torsional strength, and winding and unwinding properties as compared with those of the copper coated steel wire made by the conventional process, and more particularly such improvements can be obtained without sacrificing the other properties.

The reasons why the copper coated steel wire obtained by the present invention has remarkably good properties are the same as in the case of the aluminum coated steel wire, and further explanation is omitted.

In the foregoing, the invention has been described with an embodiment and actual results obtained thereby for a better understanding of the invention, but these are not limitative of the invention and various modifications may be derived without departing from the spirit of the invention as defined by the appended claims. For instance, the composite metal wires of the invention may be used as an electric conductor requiring high tensile strength. In such a case, instead of copper and aluminum, metals having comparatively high electric conductivity, such as copper alloys and aluminum alloys may be used as the coating metal.

The effects brought about by the pressure welding according to the present invention can be clearly recognized by comparing it with the other methods of manufacturing, such as ingot wire drawing process, electric plating process, melting extrusion process or pipe coated extrusion process. For instance, the melting wire drawing process requires extremely high technique for the production of an ingot by casting steel into molten copper and also after the wire drawing, there is trouble in adjusting the thickness of copper coating uniformly. In the electric plating process, increasing the thickness of the coated metal layer involves very high costs. The melting extrusion process necessitates a very large, expensive extrusion installation which can resist high temperature, and the pipe coated extrusion process has limitation in the length of pipe to be drawn from an ingot so that it is almost impossible ot obtain very long wire as in the present invention.

According to the invention any length of composite metal wires can be easily manufactured without the necessity of using especially expensive apparatus.

What we claim is:

1. A method for manufacturing a composite metal wire comprising, providing a core wire of steel and coating said core wire with zinc, heating the thus coated core wire to a temperature of 200 to 300° C., providing a metal tape selected from the group consisting of aluminum and copper, passing the heated core wire and the metal tape together between forming rolls and thereby wrapping said tape circumferentially around said coated core wire, passing the core wire and tape between press rolls with said core wire and tape being in a heated condition but at temperatures which are below their respective recrystallization temperature, and effecting a pressure welding of said core wire to said tape by means of said press rolls.

2. The process of claim 1, wherein the composite core wire and tape is relieved of any protruding fins after it emerges from the press rolls and the composite wire is finished to a desired outer diameter by being passed through a finishing die.

References Cited by the Examiner

UNITED STATES PATENTS

| | | | |
|---|---|---|---|
| 2,842,440 | 7/58 | Nachtman et al. | 29—498 X |

FOREIGN PATENTS

| | | |
|---|---|---|
| 122,897 | 5/31 | Austria. |
| 513,665 | 2/21 | France. |

JOHN F. CAMPBELL, *Primary Examiner.*

UNITED STATES PATENT OFFICE

CERTIFICATE OF CORRECTION

Patent No. 3,167,857

February 2, 1965

Tetsuo Saito et al.

It is hereby certified that error appears in the above numbered patent requiring correction and that the said Letters Patent should read as corrected below.

In the grant (only), lines 1 and 2, for "Kamio Kakizaki" read -- Kimio Kakizaki --.

Signed and sealed this 24th day of August 1965.

(SEAL)
Attest:

ERNEST W. SWIDER
Attesting Officer

EDWARD J. BRENNER
Commissioner of Patents